United States Patent
Perkins (10) Patent No.: US 9,104,175 B2
(45) Date of Patent: Aug. 11, 2015

(54) LIGHT SHAPING FOR IMAGING USING HOLOGRAPHY

(71) Applicant: CHRISTIE DIGITAL SYSTEMS USA, INC., Cypress, CA (US)

(72) Inventor: Michael Perkins, Kitchener, CA (US)

(73) Assignee: Christie Digital Systems USA, Inc., Cypress (*) Notice: Subject to any disclaimer, the term of this patent is extended or adjusted under 35 U.S.C. 154(b) by 210 days.

(21) Appl. No.: 13/789,805

(22) Filed: Mar. 8, 2013

(65) Prior Publication Data

US 2014/0253990 A1 Sep. 11, 2014

(51) Int. Cl.
*G02B 5/32* (2006.01)
*G03H 1/00* (2006.01)
*G03H 1/04* (2006.01)
*H04N 9/31* (2006.01)

(52) U.S. Cl.
CPC ............. *G03H 1/04* (2013.01); *H04N 9/3126* (2013.01); *H04N 9/3152* (2013.01)

(58) Field of Classification Search
None
See application file for complete search history.

(56) References Cited

U.S. PATENT DOCUMENTS

| | | | |
|---|---|---|---|
| 4,368,946 A * | 1/1983 | Kaneko et al. | 359/25 |
| 5,179,398 A * | 1/1993 | Iizuka | 353/30 |
| 6,808,269 B2 | 10/2004 | Cobb | |
| 7,218,435 B2 | 5/2007 | Slinger | |
| 7,458,691 B2 | 12/2008 | Duncan | |
| 7,470,028 B2 | 12/2008 | Miller | |
| 7,639,901 B2 | 12/2009 | Lianza | |
| 7,651,227 B2 | 1/2010 | Penn et al. | |
| 7,926,951 B2 | 4/2011 | Bietry et al. | |
| 2009/0109405 A1 * | 4/2009 | Horikawa | 353/31 |
| 2011/0019112 A1 | 1/2011 | Dolgoff | |

* cited by examiner

*Primary Examiner* — Jade R Chwasz
(74) *Attorney, Agent, or Firm* — Perry + Currier Inc.

(57) ABSTRACT

A plurality of light sources of different wavelength bands can be provided. An imaging device can be configured to modulate incoming light according to video image data and output modulated light. A projection lens can be positioned to project the modulated light. An optical combiner can be disposed between the light sources and the imaging device. A plurality of holographic devices can each include a plurality of different holographic elements selectively positionable in a light path extending between one of the light sources and the optical combiner. Each of the holographic elements can define a light-shaping hologram. A controller can be configured to selectively position the holographic elements of the holographic devices based on the video image data.

27 Claims, 5 Drawing Sheets

LIGHT SHAPING FOR IMAGING USING HOLOGRAPHY

FIELD

This disclosure relates to display imaging, and more particularly, to light shaping or light modulation.

BACKGROUND

Two-stage light modulation is known to be used to improve image quality. In one type of known system, a first stage filters regions of source light, while a subsequent second stage modulates the filtered light to generate an image. Although image quality may be improved, filtered-out light is diverted and possibly wasted, which can waste energy. Wasted light may result in more heat being generated, which may require additional energy to disperse or cool. Thus, the cost of producing images of higher quality can include energy waste and increased heat, which results in a trade-off or compromise being made in many known systems.

SUMMARY

According to one aspect of the present disclosure, an image projector includes a light source, an imaging device configured to modulate incoming light according to image data and output modulated light, a projection lens positioned to project the modulated light, and a holographic device including a plurality of different holographic elements. The holographic device is configured to selectively position each of the holographic elements of the plurality of different holographic elements in a light path extending between the light source and the imaging device.

At least one of the holographic elements of the plurality of different holographic elements can include a light-shaping pattern configured to distribute light unevenly on the imaging device.

The plurality of different holographic elements can include a complementary pair of holographic elements having complementary light-shaping patterns.

At least another one of the holographic elements of the plurality of different holographic elements can include a neutral pattern configured to distribute light evenly on the imaging device.

The image projector can further include a controller configured to selectively position the plurality of different holographic elements.

The controller can be configured to perform an analysis on the image data and selectively position the plurality of different holographic elements based on the analysis.

The controller can be configured to perform the analysis by analyzing image brightness of a plurality of regions of an image represented by the image data.

The image data can represent a video and the controller can be configured to perform the analysis on individual frames of the video and selectively position the plurality of different holographic elements for each of the frames.

The controller can be configured to control an output level of the light source based on the analysis.

The holographic device can include an actuator connected to the plurality of different holographic elements to selectively position the plurality of different holographic elements.

The holographic device can include a sliding mechanism, and the plurality of different holographic elements can be arranged in a linear arrangement along a sliding axis.

The holographic device can include a rotational mechanism, and the plurality of different holographic elements can be arranged in a circular arrangement about an axis of rotation.

The image projector can further include a plurality of holographic devices each having a plurality of different holographic elements. The image projector can further include a plurality of light sources of different wavelength bands. Each light source can be for providing light to one of the holographic devices.

The image projector can further include an optical combiner disposed between the plurality of holographic devices and the imaging device.

The image projector can further include Fourier optical components disposed between the plurality of holographic devices and the optical combiner.

The image projector can further include relay optics disposed between the optical combiner and the imaging device.

According to another aspect of the present disclosure, a method of shaping light for an imaging device includes selecting a holographic element from a plurality of different holographic elements having different light-shaping patterns, and positioning the selected holographic element in a path of light emitted from a light source. The selected holographic element distributes light onto an imaging device according to the light-shaping pattern of the selected holographic element. The imaging device outputs images based on image data and the distributed light received from the selected holographic element.

The method can further include selecting and positioning a plurality of selected holographic elements in the paths of light emitted from a plurality of light sources of different wavelength bands. The selected holographic elements distribute light onto the imaging device according to the light-shaping patterns of the selected holographic elements. The imaging device outputs images based on image data and the distributed light received from the selected holographic elements.

The method can further include performing an analysis on the image data provided to the imaging device and selecting the holographic element from the plurality of different holographic elements based on the analysis.

Performing the analysis can include analyzing image brightness of a plurality of regions of an image represented by the image data.

The image data can represent a video and the analysis can be performed on individual frames of the video. Selecting the holographic element from the plurality of different holographic elements can be performed for each of the frames.

The method can further include controlling a level of light emitted by the light source according to the analysis.

According to another aspect of the present disclosure, an image projector includes a plurality of light sources of different wavelength bands, an imaging device configured to modulate incoming light according to video image data and output modulated light, a projection lens positioned to project the modulated light, an optical combiner disposed between the light sources and the imaging device, and a plurality of holographic devices. Each holographic device includes a plurality of different holographic elements selectively positionable in a light path extending between one of the light sources and the optical combiner. Each of the holographic elements has a light-shaping pattern. The image projector also includes a controller configured to selectively position the holographic elements of the holographic devices based on the video image data.

BRIEF DESCRIPTION OF THE DRAWINGS

The drawings illustrate, by way of example only, embodiments of the present disclosure.

DETAILED DESCRIPTION

This disclosure describes teachings for what may be known as zonal illumination, beam steering, light shaping, light directing, or light modulation. By way of example, a two-stage projection system is described, the system having a first stage for relatively coarse shaping of light and a second stage for generating an image using the shaped light. However, it should be understood that systems other than two-stage projectors can employ the teachings described herein. In addition, this disclosure applies to any kind of image, and the terms image and image data may refer to still images, frames of video, and similar.

It should be understood from the below that the teachings described herein can result in improved energy efficiency, improved image contrast, and improved dynamic range. By using these teachings, it is possible to generate an image having localized regions of very high brightness coexisting with regions that are very dark.

Figure 1:
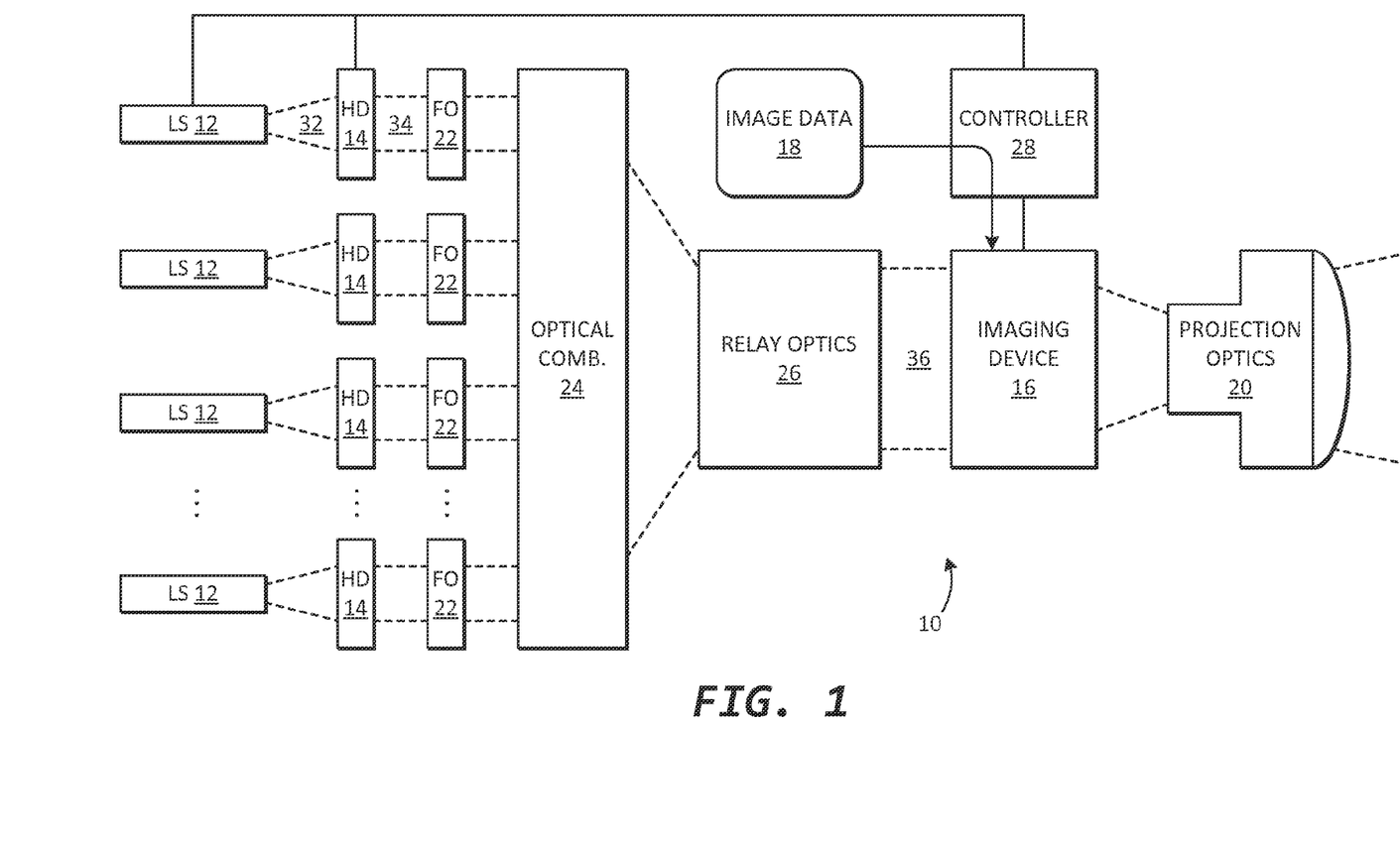
FIG. 1 is a block diagram of an image projector according to an embodiment of the present disclosure.

FIG. 1 illustrates an image projector 10 according to an embodiment of the present disclosure.

The image projector 10 includes at least one highly collimated monochromatic light source 12, such as a laser. In this embodiment, a plurality of light sources 12 is provided. The light sources 12 can include beam expanders, optics, and similar components. The light sources 12 may be of different wavelengths and accordingly provide different color components, as will be discussed in detail below. Each of the light sources 12 may include a plurality of discrete light sources, so as to increase overall light intensity available for projection.

The image projector 10 further includes at least one holographic device 14. In this embodiment, a plurality of holographic devices 14 is provided, one for each light source 12. Each of the holographic devices 14 includes a plurality of different holographic elements. Each of the holographic elements is configured to shape light emitted by the light source 12 differently. Each holographic device 14 is configured to selectively position each of its holographic elements in a light path that originates at the light source 12 and extends to an imaging device 16. The selected holographic element shapes light 32 emitted by the light source 12 to output shaped light 34.

The imaging device 16 is configured to modulate incoming light according to image data 18 and output modulated light to a projection lens 20. The imaging device 16 can include a set of LCD light valves, a digital micro-mirror device (DMD), a liquid crystal on silicon device (LCOS) or similar.

The projection lens 20 is positioned to project the modulated light received from the imaging device 16 onto a screen or other surface. Additional projection optics may be included.

In this embodiment, the image projector 10 further includes Fourier optical components 22, an optical combiner 24, and relay optics 26. The Fourier optical components 22 may be disposed between the holographic devices 14 and the optical combiner 24. The relay optics 26 may be disposed between the optical combiner 24 and the imaging device 16.

The Fourier optical components 22 are configured to condition the light 34 output by the holographic devices 14 to produce light suitable for summation in the optical combiner 24. The Fourier optical components 22 can be selected and configured according to the nature of the light produced by the light sources 12, and the specific implementations of the holographic devices 14 and optical combiner 24.

The optical combiner 24 is configured to combine light as shaped by the holographic devices 14 and Fourier optical components 22 into a beam that includes a brightness and wavelength profile for use by the imaging device 16. The optical combiner 24 can include an array of light pipes, prisms, lenses, dichroics, mirrors, or other optical elements, as is known.

The relay optics 26 are configured to deliver the beam output by the optical combiner 24 to the imaging device 16. The relay optics 26 may include any number, type, and configuration of lenses and other optical components for the specific geometries and light characteristics to be accommodated.

The image projector 10 further includes a controller 28 connected to at least the imaging device 16 and the holographic devices 14. The controller 28 can further be connected to the light sources 12 to individually control the amount of light emitted by the light sources 12. The controller 28 is configured to selectively position the plurality of different holographic elements of each of the holographic devices 14, so as to selectively shape the light 32 emitted by the light sources 12 into a beam that is efficient for the imaging device 16. The controller 28 can drive the holograph devices 14 based on image data 18 representing images to be generated by the imaging device 16. Modulating light input to the imaging device 16 in this way can increase the dynamic range available for image projection. Further, the controller 28 can control output of the light sources 12 so as to keep the light generated consistent with what is demanded for the image data 18. For instance, if the image data 18 represents a frame of video that is generally dark with one local region of high brightness, then the controller 28 controls the light sources to reduce the amount of light emitted. The holographic devices 14 are controlled to shape the reduced amount of light emitted by the light sources 12 to meet the brightness requirement of the local region, while also meeting the darkness requirements of the remainder of the image without wasting much light. Because light shaping is performed by holographic elements, less light is wasted than with conventional light modulating techniques, which may lead to an increase in energy efficiency and less waste heat. Images projected by the image projector 10 may also have higher contrast than can be produced by known techniques. Further, local regions of very high brightness can be produced in the same image as local regions of very low brightness.

Figure 2:
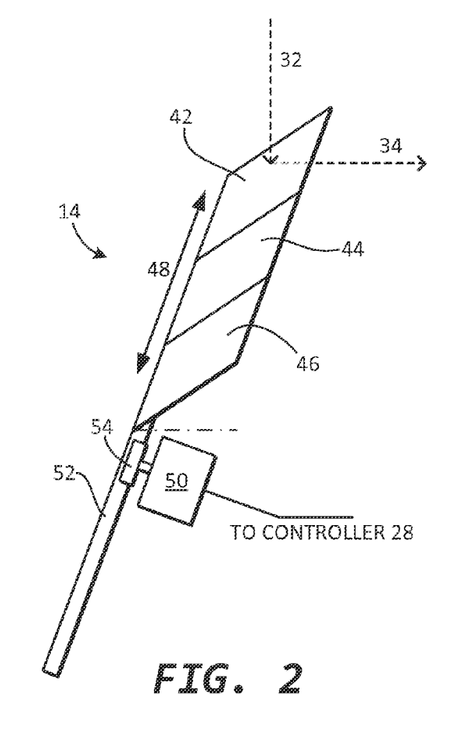
FIG. 2 is a diagram of a holographic device of the image projector.

FIG. 2 illustrates an example of a holographic device 14.

The holographic device 14 includes a plurality of different holographic elements 42, 44, 46. In this embodiment, three holographic elements 42, 44, 46 are provided. The holographic device 14 further comprises an actuator 50 connected to the holographic elements 42, 44, 46 to selectively position one of the holographic elements in the path of the light 32 emitted by the light source 12. In this embodiment, the holographic elements 42, 44, 46 are arranged in a linear arrangement along a sliding axis 48. The actuator 50 can be a stepper motor connected to the holographic elements 42, 44, 46 by a linear sliding mechanism, such as a toothed rack 52 and pinion 54. The actuator 50 has its control input connected to the controller 28 to move the holographic elements 42, 44, 46 along the sliding axis 48.

Each of the holographic elements 42, 44, 46 includes a light-shaping pattern configured to ultimately distribute light unevenly on the imaging device 16. The light-shaping pattern can be provided on a hologram recording medium such as a substrate applied with a photographic emulsion, dichromated gelatin, photopolymer, photorefractive material, or similar, so that each of the holographic elements 42, 44, 46 defines a permanent hologram. The relatively uniform beam of light 32 emitted by the light source 12 can thus be shaped into light 34 having an illumination pattern corresponding to whichever of the different holographic elements 42, 44, 46 is positioned in the path of the light 32.

The holographic elements 42, 44, 46 are illustrated oriented at 45 degrees with respect to the beams 32, 34, which are perpendicular with respect to one another. This is for explanatory purposes and many other geometries are possible. Different geometries may be implemented depending on whether the holographic elements 42, 44, 46 embody reflection holograms or transmission holograms.

Figure 3A:
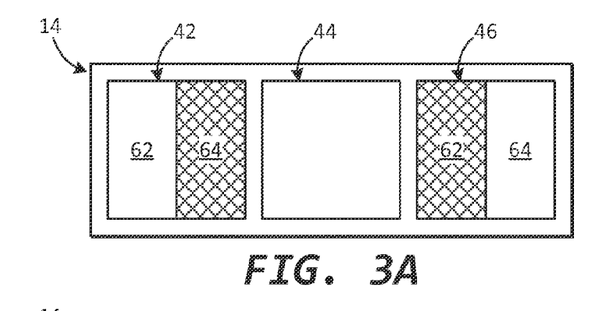
FIGS. 3A-3C are diagrams of example light patterns produced by different holographic devices.
Figure 3B:
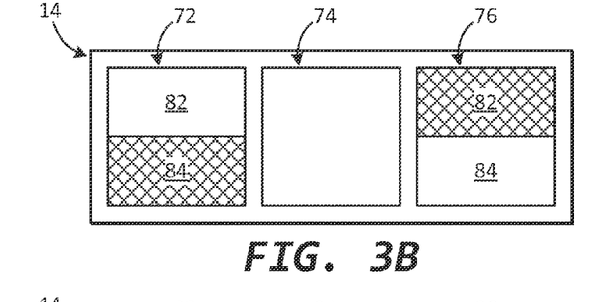
Figure 3C:
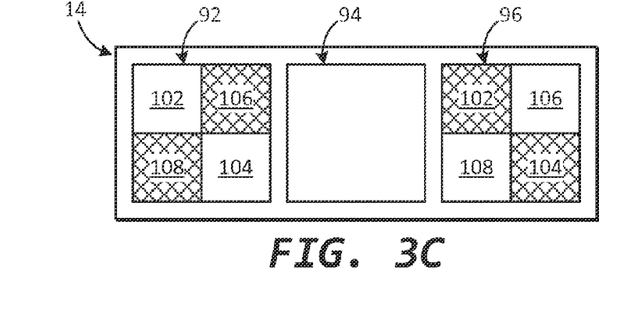

FIGS. 3A-3C show example illumination patterns that the holographic devices 14 can be configured to produce. The patterns are illustrated as received by the imaging device 16, at 36 in FIG. 1. It should be appreciated that the shape of light beams at locations up-beam of the imaging device 16 may be different.

FIG. 3A shows a holographic device 14 having holographic elements 42, 44, 46. Holographic element 42 is configured to direct light to a left region 62 of the imaging device 16. Accordingly, a right region 64 of the imaging device 16 receives less or even no light from the respective light source 12.

The holographic element 46 is configured to direct light to the right region 64 of the imaging device 16. Accordingly, the left region 62 of the imaging device 16 receives less or even no light from the respective light source 12.

The holographic elements 42, 46 form a complementary pair that has complementary light-shaping patterns. A holographic device 14 that implements holographic elements 42, 46 can therefore be controlled to direct light to either the left region 62 or the right region 64 of the imaging device 16.

Further, the holographic element 44 of the holographic device 14 may be provided with a neutral pattern configured to distribute light relatively evenly on the imaging device 16. Thus, the holographic device 14 can be further controlled to not direct light to any particular region of the imaging device 16.

FIG. 3B shows a holographic device 14 having holographic elements 72, 74, 76. Holographic element 72 is configured to direct light to an upper region 82 of the imaging device 16. Accordingly, a lower region 84 of the imaging device 16 receives less or even no light from the respective light source 12. The holographic element 76, which is complementary to the holographic element 72, is configured to direct light to the lower region 84. Accordingly, the upper region 82 receives less or even no light from the respective light source 12. The holographic element 74 has a neutral pattern configured to distribute light relatively evenly on the imaging device 16.

FIG. 3C shows a holographic device 14 having holographic elements 92, 94, 96. Holographic element 92 is configured to direct light to an upper left region 102 and a lower right region 104 of the imaging device 16. Accordingly, an upper right region 106 and a lower left region 108 of the imaging device 16 receive less or even no light from the respective light source 12. The holographic element 96, which is complementary to the holographic element 92, is configured to direct light to the upper right region 106 and the lower left region 108. Accordingly, the upper left region 102 and the lower right region 104 receive less or even no light from the respective light source 12. The holographic element 94 has a neutral pattern configured to distribute light relatively evenly on the imaging device 16.

The light sources 12 for a plurality of holographic devices 14, such as those shown in FIGS. 3A-3C, can be of the same wavelength band. Further, the optical combiner 24 can be configured to combine the light from holographic devices 14 of the same wavelength band to create a combined light profile for the wavelength band. Independently controlled sets of light sources 12 and holographic devices 14 can be provided for different wavelength bands. Accordingly, the imaging device 16 can receive illumination patterns for different color components.

Figure 4:
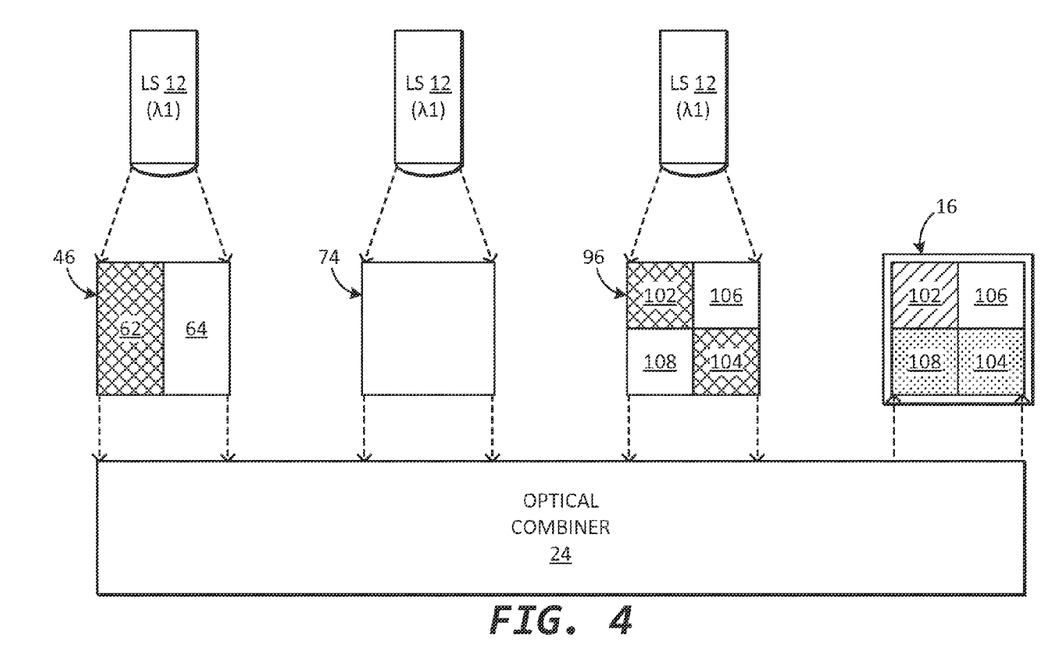
FIG. 4 is a schematic diagram of components of the image projector and an example of combining the effects of several holographic devices.

FIG. 4 shows a schematic diagram of components of the image projector 10 illustrating an example of combining the effects of several holographic devices 14. The example holographic devices 14 of FIGS. 3A-3C will be referenced, but it should be appreciated that any configuration of holographic devices 14 can be used.

Several light sources 12 of the same wavelength band are provided. At the instant shown, the holographic devices 14 are driven to place holographic elements 46, 74, 96 into the path of the respective light source 12. Output of the holographic devices 14 is combined by the optical combiner 24, which outputs a combined beam to the imaging device 16. Accordingly, at the imaging device 16, the upper right region 106 is at high brightness because all three holographic elements 46, 74, 96 direct light to the upper right region 106. The lower regions 104, 108 of the imaging device 16 receive less light due to light being directed away from these regions by two of the holographic elements 46, 96. The upper left region 102 receives still less light due to only the holographic element 74 providing light to this region.

Figure 5:
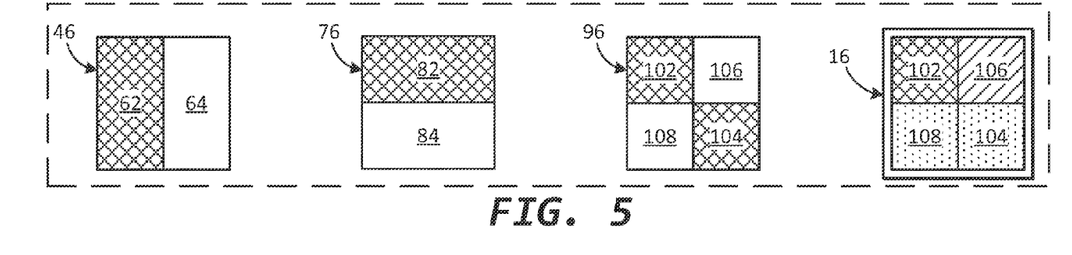
FIG. 5 is a diagram of another example of combining the effects of several holographic devices.

FIG. 5 shows another example of combining the effects of several holographic devices 14. In this example, the holographic element 74 of FIG. 4 is replaced by the holographic element 76. This can occur, for example, when the image to be projected changes. Because the neutral holographic element 74 is replaced by the holographic element 76, which directs light towards the lower region 84 of the imaging device 16, resulting in the top left and top right regions 102, 106 receiving less light than in the example configuration of FIG. 4, while the bottom left and bottom right regions 108, 104 receive more light.

As mentioned, the combining effects of the holographic devices 14 can be used for light sources 12 of various wavelengths, so that the imaging device 16 receives light suitable for generating a full-color projected image. In one example, red, green, and blue laser light sources 12 are used. Each light source 12 has three lasers of the same color, and each light source 12 provides a beam to a particular holographic device 14 of a set of three different holographic devices 14 (e.g., see FIGS. 3A-3C). Thus, for each color, nine lasers are used, modulated in three groups of three. A total of 27 lasers are thus used to provide illumination patterns of different colors to the imaging device 16.

Figure 6:
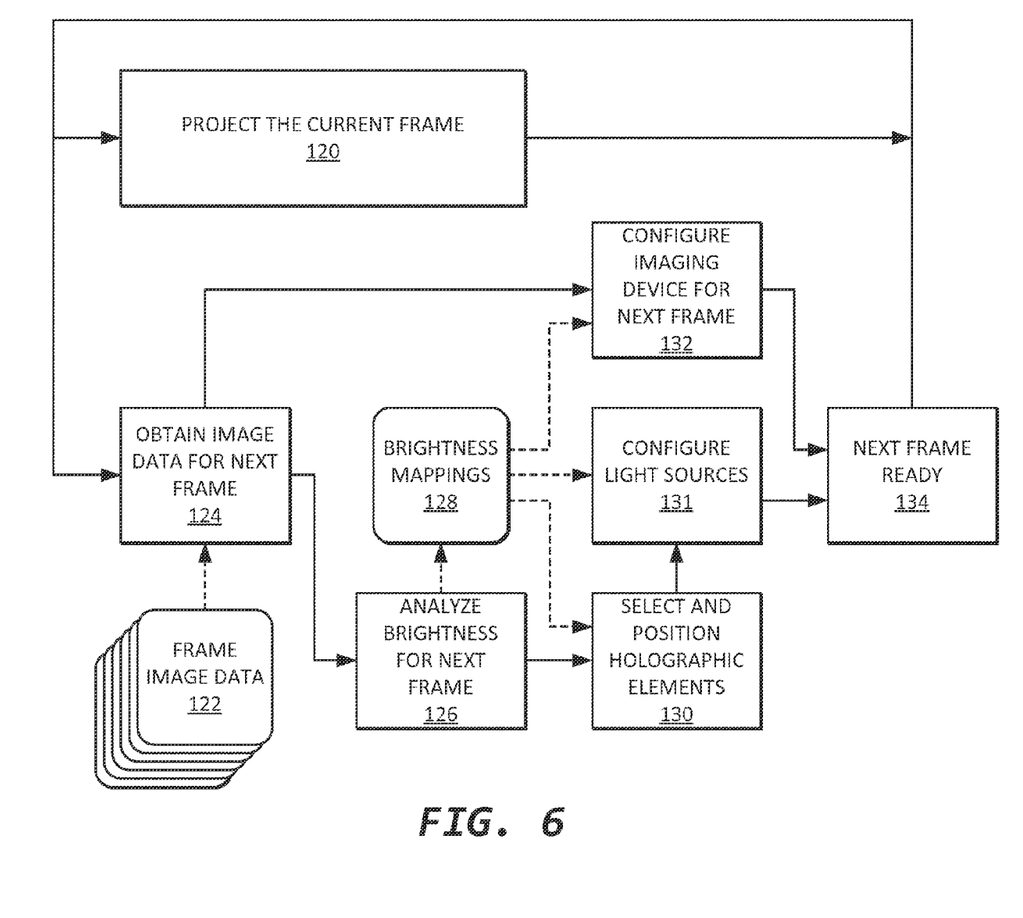
FIG. 6 is a flowchart of a method for light shaping using holographic devices.

FIG. 6 shows a flowchart of a method of shaping incoming light for use by an imaging device. The method can be used with the imaging device 16 of the image projector 10, as implemented at the controller 28, and will be described in this context. However, the method need not be tied to any particular apparatus. Further, the method is described in the context of video, but the method is not limited in application to video. In addition, in the context of multiple colors, brightness as discussed herein can be interpreted as intensity of light of a particular wavelength band.

At 120, the current frame of video is output by the imaging device 16 for projection.

At about the same time, image data for the next frame 122 to be projected is obtained, at 124. This can be performed by the controller 28 loading image data for the next frame into working memory.

After the next frame image data is loaded and as the current frame is projected, the next frame image data is analyzed, at 126. The analysis is performed to determine which holographic elements of the holographic devices 14 should be selected to increase light efficiency for the next frame. In this embodiment, the analysis includes analyzing image brightness for a plurality of regions, such as regions 102, 104, 106, 108 of FIGS. 3A-3C. In this context, image brightness can be interpreted as an amount of light (intensity) for a particular color required to be delivered by the light sources 12. For an imaging device that operates with multiple colors, the analysis can be performed for each color. For example, suppose that the color space is RGB and different holographic devices 14 are provided for red, green, and blue light sources 12. The brightness analysis thus includes determining maximum and minimum red, green, and blue levels required at each of the regions 102, 104, 106, 108 of the imaging device 16. If the image contains a region requiring full intensity red, then the holographic elements of the holographic devices 14 corresponding to the red light sources are selected to provide such. If another region of the image requires little or no red, then the holographic elements are selected with this also taken into account. The same applies to the other color components. In some embodiments, the analysis 126 can reference brightness mappings 128 that include one or more lookup tables storing relationships between determined color intensity in regions of the image to be projected and the resulting holographic elements to select.

The holographic elements are selected, at 130, according to the analysis 126 and the brightness mappings 128. Then, after projection of the current frame ends, the selected holographic elements are positioned in the light path of the respective light sources 12, so as to distribute light onto the imaging device 16 according to the light-shaping patterns determined by the analysis 126. This can be accomplished by, for example, the controller 28 controlling the actuators 50. Accordingly, for greater computational efficiency, the brightness mappings 128 may store regional brightness requirements in association with actuator positions.

At about the same time as the holographic elements are being positioned, at 130, the light sources 12 are configured, at 131. For instance, laser power levels can be adjusted according to the brightness mappings 128 to ensure that a suitable total amount of light is emitted. If a light source 12 includes a plurality of individual light sources, then each individual light source can be turned off or turned on to a specific power level. To facilitate this, the brightness mappings 128 may further store light source output levels in association with regional or average brightness requirements. Light source output levels may be stored as power levels or power control parameters for direct control of the light sources 12.

At about the same time as the holographic elements are being moved into position for the next frame (at 130) and the light sources 12 are having their outputs adjusted (at 131) the imaging device 16 is configured for the next frame, at 132. The imaging device 16 can be configured based on the image data 124 and further based on the selected holographic elements (e.g., mappings 128), so that the product of the pixels values of the imaging device 16 and the local amount of light available, as provided by the holographic elements, equals the desired image.

Configuring the holographic elements, at 130, and controlling output levels of the light sources, at 131 can be performed sequentially in any order (as depicted) or in parallel.

Configuring the holographic elements, light sources, and imaging device for the next frame, at 130, 131, 132, is controlled to occur after projection of the current frame has ended. Once the holographic elements are in position, the light source levels are adjusted, and the imaging device is configured for the next frame, at 134, then the next frame becomes the current frame and the method is repeated.

Memory pipelining or double-buffering can be used to reduce the transition time between frames. That is, holographic element actuator positions and light source levels can be pre-calculated for one or more frames ahead of the current frame. Then, in response to a frame transition synchronization signal, the pre-calculated holographic element actuator positions and light source levels can be activated.

Holographic elements can be selected and positioned (or have a current positioned confirmed) for each frame of a video during real-time playback. The time required for positioning the holographic elements, at 130, is not expected to be substantially longer than the time needed to configure the imaging device 16 for the next frame, when pipelining or double-buffering is employed. However, analysing image brightness and positioning holographic elements need not be performed for each frame. Brightness analysis can be performed for a set of frames, and holographic elements can be positioned on that basis. In other embodiments, a block of frames can be processed together. For example, average regional brightness for the next 24 frames can be determined and the holographic elements can be moved to the resulting positions at the time the first frame of the set is projected. The holographic elements can remain in these positions for the next 23 frames, while a brightness analysis is carried out for the next set of 24 frames. This can reduce processing load as well as extend the life of mechanical components involved in moving the holographic elements. In a similar manner, light source output levels can also be processed for a block of frames.

In other embodiments, one result of the brightness analysis is a number of frames for which to maintain the holographic elements at their current positions, while another result is the next configuration of holographic elements to select after such number of frames. Again, the brightness analysis can be performed independently for each color component, so in such an embodiment, holographic elements for one color component may change at a particular frame, while holographic elements of another color component remain in place. In a similar manner, a number of frames to maintain light source output at current levels and a particular frame at which to adjust light source levels can be determined.

In still other embodiments, an entire video or portion thereof is preprocessed to obtain a set of selected holographic elements and light source output levels, which are included as metadata with the source video. In such embodiments, real-time or near real-time processing is not performed and the output of the analysis at 130, 131 (FIG. 6) can be saved rather than being used for immediate control. This can advantageously permit the creator or editor of a digital film to benefit from the advantages discussed herein during editing.

Figure 7:
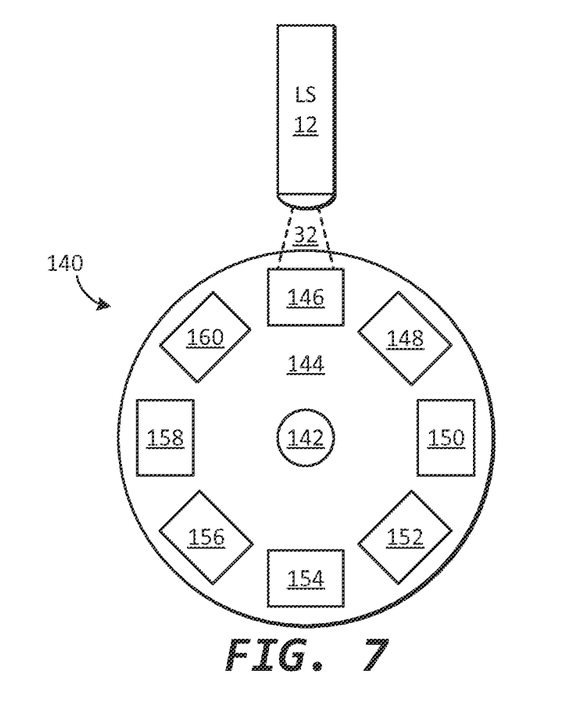
FIG. 7 is a diagram of a holographic device according to another embodiment.

FIG. 7 shows another embodiment of a holographic device 140. Holographic devices 140 can be used in the image projector 10 instead of holographic devices 14. The holographic device 140 is similar to the holographic device 14 and only differences will be discussed in detail.

The holographic device 140 include a rotational mechanism, such as a central shaft 142 that connects a disc 144 to an actuator (not shown; see actuator 50 of FIG. 2). A plurality of different holographic elements 146-160 are mounted to the disc 144 and arranged in a circular arrangement about a central axis of rotation. A controller (e.g., controller 28) controls the disc 144 to rotate to place a selected one of the holographic elements 146-160 in the path of light 32 emitted by the light source 12. Light shaped according to the selected holographic element 146-160 is then output, which, in this example is normal to the plane of FIG. 7.

Figure 8:
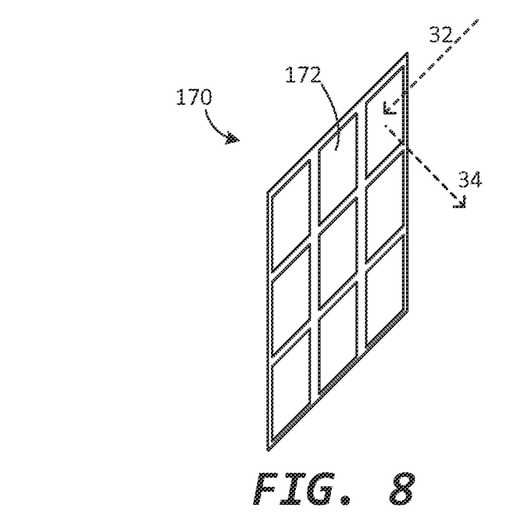
FIG. 8 is a diagram of a portion of a holographic device according to another embodiment.

FIG. 8 shows a portion of a holographic device 170 according to another embodiment. Holographic devices 170 can be used in the image projector 10 instead of holographic devices 14. The holographic device 170 is similar to the holographic device 14 and only differences will be discussed in detail.

The holographic device 170 includes a plurality of different holographic elements 172 arranged in a grid-like pattern. A suitable two-dimensional sliding mechanism can be provided to permit a controller (e.g., controller 28) to place a selected one of the holographic elements 172 in the path of light 32 emitted by the light source 12. Light 34 shaped according to the selected holographic element 172 is then output.

In other embodiments, not all of the holographic elements provided to a given holographic device are different. Some of the holographic elements can be the same and located at positions relative to other holographic elements based on expected demand and the time required to transition between holographic elements. For example, referring to FIG. 7, every second holographic element 146, 150, 154, 158 may provide the same light-shaping pattern, if such pattern is expected to be required more frequently than other patterns. This can result in less movement and shorter time to place frequently demanded holographic elements in the path of light to be shaped. In this example, a maximum of one incremental movement of the disc 144 is required in order to arrive at the frequently demanded holographic element 146, 150, 154, 158.

It is worth noting that, because holographic elements are used to modulate light provide by the light sources, light is directed without the kinds of losses typical of systems that modulate light by filtering light of certain regions of an imaging device. Very bright regions and very dark regions can be provided in the same image. Further, as the efficiency of the holographic elements increases, less light is wasted and less heat is generated. In addition, precise positioning of the holographic elements is not required because holograms function despite imperfect alignment with light beams to be shaped. Further, using mechanically positioned, permanent holograms is advantages over using computer-generated holograms due to the higher quality of permanent holograms and lower processing requirements required to position permanent holograms when compared to processing requirements for controlling computer-generated holograms.

While the foregoing provides certain non-limiting example embodiments, it should be understood that combinations, subsets, and variations of the foregoing are contemplated. The monopoly sought is defined by the claims.

What is claimed is:

1. An image projector comprising:
a light source;
an imaging device configured to modulate incoming light according to image data and output modulated light;
a projection lens positioned to project the modulated light;
a holographic device including a plurality of different holographic elements, each holographic element defining a permanent hologram, the holographic device configured to selectively position each of the holographic elements of the plurality of different holographic elements in a light path extending between the light source and the imaging device; and
a controller configured to perform an analysis on the image data and selectively position the plurality of different holographic elements based on the analysis, the controller being configured to perform the analysis image brightness of a plurality of regions of an image represented by the image data.

2. The image projector of claim 1, wherein at least one of the holographic elements of the plurality of different holographic elements comprises a light-shaping pattern configured to distribute light unevenly on the imaging device.

3. The image projector of claim 2, wherein the plurality of different holographic elements comprises a complementary pair of holographic elements having complementary light-shaping patterns.

4. The image projector of claim 2, wherein at least another one of the holographic elements of the plurality of different holographic elements comprises a neutral pattern configured to distribute light evenly on the imaging device.

5. The image projector of claim 1, wherein the image data represents a video and the controller is configured to perform the analysis on individual frames of the video and selectively position the plurality of different holographic elements for each of the frames.

6. The image projector of claim 1, wherein the controller is configured to control an output level of the light source based on the analysis.

7. The image projector of claim 1, wherein the holographic device comprises an actuator connected to the plurality of different holographic elements to selectively position the plurality of different holographic elements.

8. The image projector of claim 1, wherein the holographic device comprises a sliding mechanism, and the plurality of different holographic elements are arranged in a linear arrangement along a sliding axis.

9. The image projector of claim 1, wherein the holographic device comprises a rotational mechanism, and the plurality of different holographic elements are arranged in a circular arrangement about an axis of rotation.

10. The image projector of claim 1, comprising a plurality of holographic devices each having a plurality of different holographic elements, the image projector comprising a plurality of light sources of different wavelength bands, each light source for providing light to one of the holographic devices.

11. The image projector of claim 10, further comprising an optical combiner disposed between the plurality of holographic devices and the imaging device.

12. The image projector of claim 11, further comprising Fourier optical components disposed between the plurality of holographic devices and the optical combiner.

13. The image projector of claim 12, further comprising relay optics disposed between the optical combiner and the imaging device.

14. A method of shaping light for an imaging device, the method comprising:
performing an analysis on image data provided to the imaging device, performing the analysis including analyzing image brightness of a plurality of regions of an image represented by the image data;
base on the analysis, selecting a holographic element from a plurality of different holographic elements having different light-shaping patterns, each holographic element defining a permanent hologram;
positioning the selected holographic element in a path of light emitted from a light source;
the selected holographic element distributing light onto an imaging device according to the light-shaping pattern of the selected holographic element; and
the imaging device outputting images based on the image data and the distributed light received from the selected holographic element.

15. The method of claim 14, comprising:
selecting and positioning a plurality of selected holographic elements in the paths of light emitted from a plurality of light sources of different wavelength bands;
the selected holographic elements distributing light onto the imaging device according to the light-shaping patterns of the selected holographic elements; and
the imaging device outputting images based on the image data and the distributed light received from the selected holographic elements.

16. The method of claim 14, wherein the image data represents a video and the analysis is performed on individual frames of the video, and wherein selecting the holographic element from the plurality of different holographic elements is performed for each of the frames.

17. The method of claim 14, further comprising controlling a level of light emitted by the light source according to the analysis.

18. An image projector comprising:
a plurality of light sources of different wavelength bands;
an imaging device configured to modulate incoming light according to image data and output modulated light;
a projection lens positioned to project the modulated light;
a plurality of holographic devices, each holographic device having a plurality of different holographic elements, each holographic element defining a permanent hologram, each holographic device configured to selectively position each of its holographic elements in a light path extending between a respective light source of the plurality of light sources and the imaging device;
an optical combiner disposed between the plurality of holographic devices and the imaging device; and
Fourier optical components disposed between the plurality of holographic devices and the optical combiner.

19. The image projector of claim 18, further comprising relay optics disposed between the optical combiner and the imaging device.

20. The image projector of claim 18, wherein at least one of the holographic elements of the plurality of different holographic elements of at least one holographic device comprises a light-shaping pattern configured to distribute light unevenly on the imaging device.

21. The image projector of claim 20, wherein the plurality of different holographic elements of at least one holographic device comprises a complementary pair of holographic elements having complementary light-shaping patterns.

22. The image projector of claim 20, wherein at least another one of the holographic elements of the plurality of different holographic elements of at least one holographic device comprises a neutral pattern configured to distribute light evenly on the imaging device.

23. The image projector of claim 18, wherein the image data represents a video and the image projector further comprises a controller configured to perform an analysis on individual frames of the video and selectively position the plurality of different holographic elements of each holographic device for each of the frames.

24. The image projector of claim 18, further comprising a controller configured to perform an analysis on the image data and to control an output level of at least one of the light sources based on the analysis.

25. The image projector of claim 18, wherein at least one holographic device comprises an actuator connected to the plurality of different holographic elements of the at least one holographic device to selectively position the plurality of different holographic elements.

26. The image projector of claim 18, wherein at least one holographic device comprises a sliding mechanism, and the plurality of different holographic elements of the at least one holographic device are arranged in a linear arrangement along a sliding axis.

27. The image projector of claim 18, wherein at least one of the holographic devices comprises a rotational mechanism, and the plurality of different holographic elements of the at least one holographic device are arranged in a circular arrangement about an axis of rotation.

* * * * *